(12) United States Patent
Moyer (10) Patent No.: US 7,430,642 B2
(45) Date of Patent: Sep. 30, 2008

(54) SYSTEM AND METHOD FOR UNIFIED CACHE ACCESS USING SEQUENTIAL INSTRUCTION INFORMATION

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 253 days.

(21) Appl. No.: 11/149,670

(22) Filed: Jun. 10, 2005

(65) Prior Publication Data

US 2006/0282621 A1   Dec. 14, 2006

(51) Int. Cl.
 *G06F 12/12*   (2006.01)
(52) U.S. Cl. ..................... 711/141; 711/128
(58) Field of Classification Search ............... 711/141, 711/128
 See application file for complete search history.

(56) References Cited

U.S. PATENT DOCUMENTS

| | | | |
|---|---|---|---|
| 4,541,045 A | 9/1985 | Kromer, III | |
| 5,594,765 A | 1/1997 | Oh | |
| 5,604,877 A | 2/1997 | Hoyt et al. | |
| 5,809,549 A | 9/1998 | Thome et al. | |
| 5,826,108 A | 10/1998 | Sonobe | |
| 5,835,969 A | 11/1998 | Inagaki et al. | |
| 5,860,106 A * | 1/1999 | Domen et al. | 713/324 |
| 6,073,230 A | 6/2000 | Pickett | |
| 6,101,595 A | 8/2000 | Pickett | |
| 6,151,662 A | 11/2000 | Christie et al. | |
| 6,205,536 B1 | 3/2001 | Yoshida | |
| 6,275,926 B1 | 8/2001 | Samra | |
| 6,678,792 B2 | 1/2004 | Van de Waerdt | |
| 6,834,327 B2 * | 12/2004 | Lyon | 711/122 |
| 6,976,126 B2 * | 12/2005 | Clegg et al. | 711/128 |
| 2004/0030838 A1 | 2/2004 | Van de Waerdt | |
| 2004/0181631 A1 * | 9/2004 | Clegg et al. | 711/128 |

OTHER PUBLICATIONS

Actions on the Merits by the U.S.P.T.O. as of Oct. 22, 2007, 2 pages.
Patterson et al., "Computer Architecture A Quantitative Approach," 2nd Edition, 1996, pp. 271-273.
Ma et al., "Way Memoization to Reduce Fetch Energy in Instruction Caches," MIT Laboratory for Computer Science, Cambridge, MA, pp. 1-8.

* cited by examiner

*Primary Examiner*—Kevin Ellis
*Assistant Examiner*—Hamdy S Ahmed (57) ABSTRACT

Techniques for accessing a unified cache to obtain instruction information are provided. One exemplary technique includes accessing, during a first instruction access, a first cache line of a first way of a unified cache having a plurality of ways to obtain instruction information associated with a first instruction, enabling the first way and disabling one or more of the remaining ways of the unified cache in response to a determination that the first cache line comprises instruction information associated with a second instruction, and accessing, during a second instruction access, the first cache line of the first way to obtain instruction information associated with the second instruction.

19 Claims, 5 Drawing Sheets

SYSTEM AND METHOD FOR UNIFIED CACHE ACCESS USING SEQUENTIAL INSTRUCTION INFORMATION

CROSS-REFERENCE TO RELATED APPLICATIONS

The present application is related to U.S. patent application Ser. No. 09/667,122, entitled "Processing System Having Sequential Address Indicator Signals," filed Sep. 21, 2000 (now issued as U.S. Pat. No. 7,124,181) and having common inventorship, the entirety of which is incorporated by reference herein.

FIELD OF THE DISCLOSURE

The present disclosure relates generally to unified cache in processing devices.

BACKGROUND

Processing systems, such as microprocessors and microcontrollers, often utilize one or more caches to store information expected to be used by the processing system, thereby reducing the frequency of memory access operations and the resulting processing delays. Some processing systems employ an instruction cache to store instructions and a separate cache to hold data. This organization is commonly referred to as a "Harvard" cache arrangement. In contrast to the Harvard cache arrangement, "unified" caches hold both instruction information and data information in a common cache for use by the processing system. In certain embodiments, unified caches have a power and cost advantage. These caches frequently are implemented as set-associative caches having multiple ways in an effort to balance the benefits and disadvantages of direct-mapped caches and fully-associative caches. During a cache access, the way associated with the address is identified and the corresponding cache line of the identified way is accessed to obtain the stored data or to write data to the cache line.

While the implementation of set-associative caches often reduces processing delays, such caches often require substantial power and can significantly increase the overall power consumption of a processing device. The power consumed by a cache often has a number of drawbacks, such as increased cost of operation, reduction in effective battery time for portable devices, excessive heat generation, and the like. The power consumption of a set-associative unified cache is particularly problematic as only one way is utilized at any given time while the remaining ways continue to draw power even though they are not in use. Accordingly, a technique for reducing the power consumption of a unified cache would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving the management and access of a unified cache in a processing system. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with a first aspect of the present disclosure, a method is provided. The method includes accessing, during a first instruction access, a first cache line of a first way of a unified cache having a plurality of ways to obtain instruction information associated with a first instruction, enabling the first way and disabling one or more of the remaining ways of the unified cache in response to a determination that the first cache line comprises instruction information associated with a second instruction, and accessing, during a second instruction access, the first cache line of the first way to obtain instruction information associated with the second instruction.

In one embodiment of the first aspect, the method further includes disabling a cache tag array of the unified cache in response to the determination that the first cache line comprises instruction information associated with the second instruction. In another embodiment of the first aspect, the method further includes accessing the unified cache for one or more data accesses between the first instruction access and the second instruction access, wherein the plurality of ways of the cache are enabled during the one or more data accesses.

In one embodiment, enabling the first way and disabling one or more of the remaining ways is further in response to a determination that a state flag is asserted and the state flag is maintained during one or more data accesses and cleared in response to a cache maintenance operation. Further, the state flag can be cleared when the instruction information associated with the second instruction comprises the last data of the first cache line.

In accordance with a second aspect of the present disclosure, a method is provided, the method including performing a first cache lookup of a unified cache for a first instruction access to obtain instruction information from a first cache line of an accessed way of the unified cache, storing resulting hit information, wherein the hit information comprises an indication of the accessed way, setting a state flag to indicate that the hit information and indicated accessed way are valid, and disabling one or more of remaining ways of the unified cache during a second instruction access in response to determining that the first cache line comprises instruction information associated with the second instruction access and determining that the state flag is set.

In one embodiment of the second aspect, the method further includes accessing the stored hit information to identify the accessed way and accessing the first cache line of the identified accessed way while the remaining ways are disabled to obtain instruction information associated with the second instruction access. The method further can include clearing the state flag in response to a determination that the instruction information associated with the second instruction access comprises a last data unit of the first cache line, wherein the state flag is cleared subsequent to accessing the first cache line to obtain the instruction information associated with the second instruction access.

In another embodiment of the second aspect, the method further includes disabling a cache tag array of the unified cache in response to determining that the first cache line comprises instruction information associated with the second instruction access and determining that the state flag is set.

In yet another embodiment, the method further includes performing a second cache lookup of the unified cache for a data access, wherein the ways of the unified cache are enabled during the second cache lookup. The data access, in one embodiment, does not change a state of the state flag.

In an additional embodiment of the second aspect, the method further includes performing a second cache lookup of the unified cache, wherein the second cache lookup results in a cache miss that causes a change to the first cache line and clearing the state flag in response to the cache miss. The method also may include clearing the state flag in response to a cache maintenance operation that causes a change to the first cache line.

In accordance with a third aspect of the present disclosure, a system is provided. The system includes a unified cache comprising a tag array and a data array, the data array comprising a plurality of ways, each way comprising a plurality of cache lines, a cache controller coupled to the tag array and data array, wherein the cache controller is operable to access, during a first instruction access, a first cache line of a first way of the unified cache to obtain instruction information associated with a first instruction, enable the first way and disable one or more of the remaining ways of the unified cache in response to a determination that the first cache line comprises instruction information associated with a second instruction and access, during a second instruction access, the first cache line of the first way to obtain instruction information associated with the second instruction.

In one embodiment of the third aspect, the cache controller further is operable to disable a cache tag array of the unified cache in response to the determination that the first cache line comprises instruction information associated with the second instruction. The cache controller further can be operable to enable the first way and disable one or more of the remaining ways further in response to a determination that a state flag is asserted. In one embodiment, the state flag is maintained during one or more data accesses. Further, the cache controller further can be operable to clear the state flag in response to a cache maintenance operation and/or when the instruction information associated with the second instruction comprises the last data of the first cache line.

FIGS. 1-5 illustrate exemplary techniques for enabling or disabling components of a unified cache during instruction accesses. In at least one embodiment, an indicator of the way accessed during a previous instruction access is temporarily stored and one or more state flags are maintained. The next instruction access to be performed is analyzed to determine if it is sequential to the previous instruction access, even if intervening non-instruction accesses to the unified cache have occurred. A sequential instruction access, as described herein, is an instruction fetch to the same cache line of the same way of a unified cache as the instruction fetch of the previous instruction access. In the event that the next instruction access is "sequential" to the previous instruction access, the stored way indicator is used to identify the way accessed during the previous instruction access and the state flag(s) are analyzed to determine if a deactivation of cache components is appropriate. If appropriate, the identified way of the unified cache is enabled while some or all of the remaining ways are disabled. Other cache components, such as the cache tag array, also may be disabled when an instruction access is identified as sequential to the previous instruction access.

Figure 1:
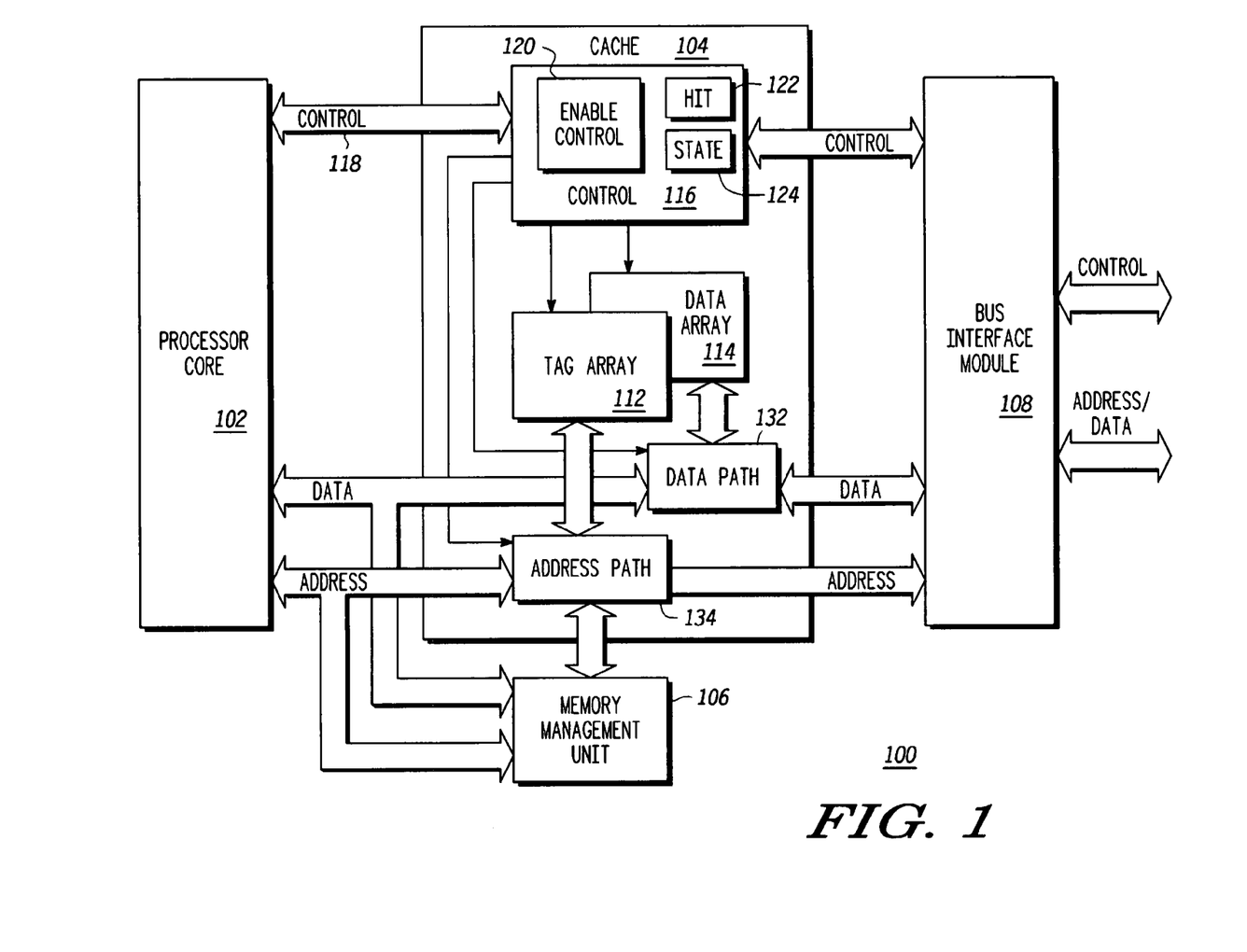
FIG. 1 is a block diagram illustrating an exemplary processing system in accordance with at least one embodiment of the present disclosure.

Referring now to FIG. 1, an exemplary processing system 100 is illustrated in accordance with at least one embodiment of the present disclosure. The processing system 100 includes a processor core 102, a unified cache 104, a memory management unit (MMU) 106 and a bus interface module 108. The processing system 100 may include, for example, a microprocessor, a microcontroller, and the like.

The unified cache 104 includes a cache tag array 112, a data array 114 and a cache controller 116. The data array 114, in at least one embodiment, includes a plurality of ways having a plurality of cache lines corresponding to a plurality of sets. For example, the data array 114 may include a thirty-two kilobyte, eight-way set-associative data array with 128 sets and thirty-two byte cache lines. The cache tag array 112 includes cache tag entries corresponding to the cache lines of data array, where the cache tag entries provide information with regard to the status (e.g., valid, locked, dirty, etc.) of the data in the corresponding cache line as well as at least a portion of the address associated with the data in the corresponding cache line. The cache controller 116 manages the operation of and access to the cache tag array 112 and the data array 114.

In one embodiment, instruction cache accesses and data cache accesses by the processor core 102 are performed using a bus connected to the unified cache 104, the MMU 106 and the bus interface 108, where the bus includes a data path 132 and an address path 134. During a cache access, the processor core 102 provides a virtual address associated with the requested data, which is used to index the cache tag array 112. The MMU 106 provides a virtual-to-physical translation of the virtual address for use in performing a compare with the address portion stored by the cache tag entry indexed by the virtual address. If the physical address matches a valid cache tag entry, the access "hits" in the cache 104 and data can be stored in (for write operations) or read from (for read operations) the "hit" cache line entry and way associated with the matched valid cache tag entry. If the physical address does not match a valid cache tag entry, the access "misses" in the cache, a load or store operation to/from memory typically is performed via the bus interface module 108, which is connected to system memory (not shown) via a system bus.

The cache controller 116, as exemplary illustrated, includes an enable control module 120, a hit information register array 122 (including one or more registers or other data storage components), and a state flag 124 (implemented as, for example, a portion of a register of the hit information register array 122 or other register). As discussed below, processor core 102 (or other component) determines whether the next instruction to be fetched would result in a cache access to the same cache line as the cache access of the previous instruction fetch (i.e., the next instruction fetch is "sequential" to the previous instruction fetch for cache access purposes) and provides the corresponding signal as part of control 118 to the cache controller 116. In response to this signal, and based on the information provided by the hit information register array 122 and the state flag 124, the enable control module 120 enables/disables ways of the data array 114 and/or the cache tag array 112. In one embodiment, the enable control module 120 identifies the way accessed during the cache access for the prior instruction and disables one or more of the other ways of data array 114, and/or the cache tag array 112 by, for example, reducing the power provided to the ways to be disabled in data array 114 and the cache tag array 112, by clock-gating one or more clocks provided to the ways to be disabled and/or the cache tag array 112, or otherwise preventing the identified ways from being accessed. As a result, the power consumption of the unified cache 104 during the cache access for the subsequent sequential instruction fetch may be reduced because the way/cache line having data for the subsequent sequential instruction fetch is known as a result of the cache access for the previous instruction fetch.

Figure 2:
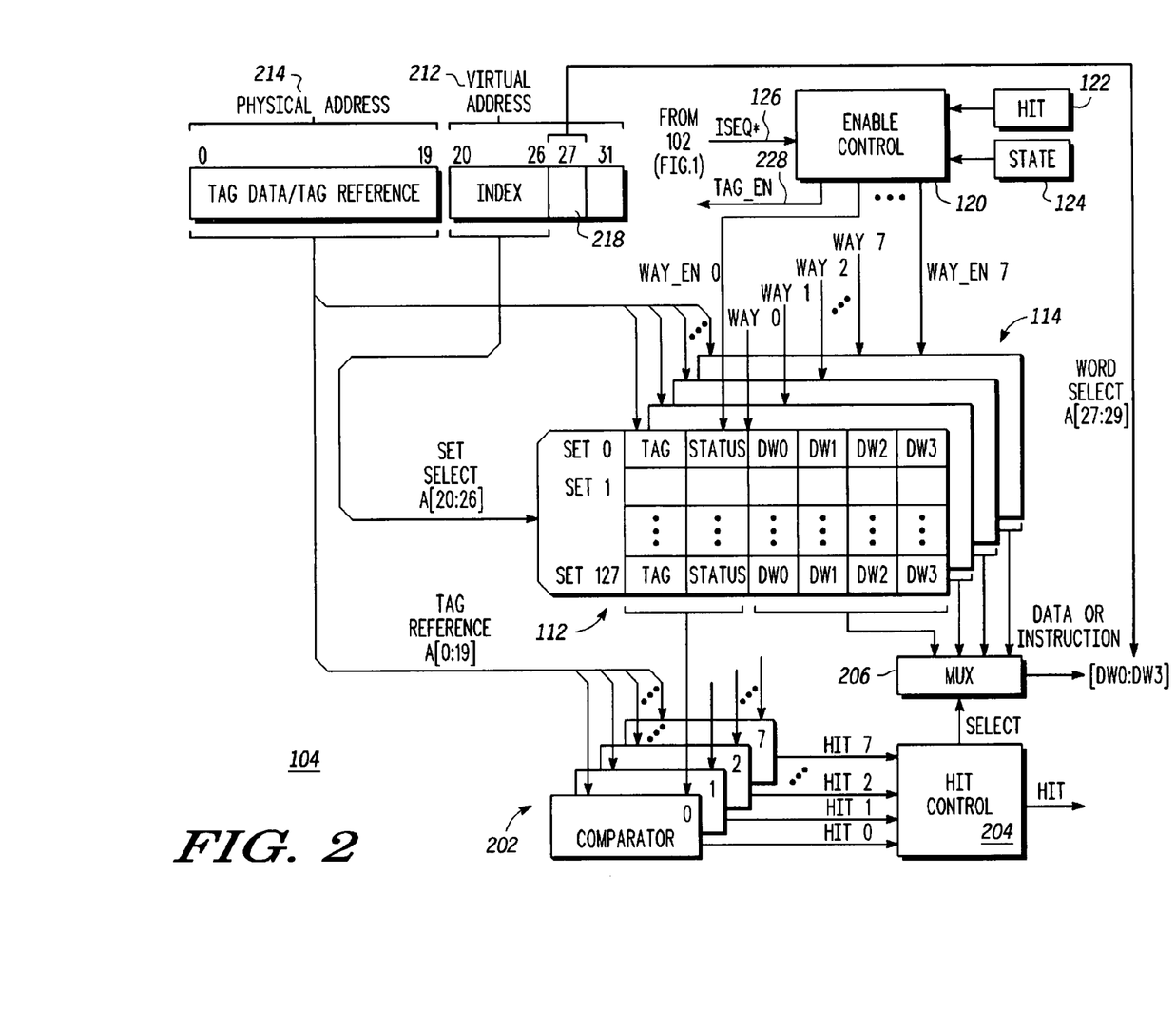
FIG. 2 is a block diagram illustrating an exemplary unified cache in accordance with at least one embodiment of the present disclosure.
Figure 5:
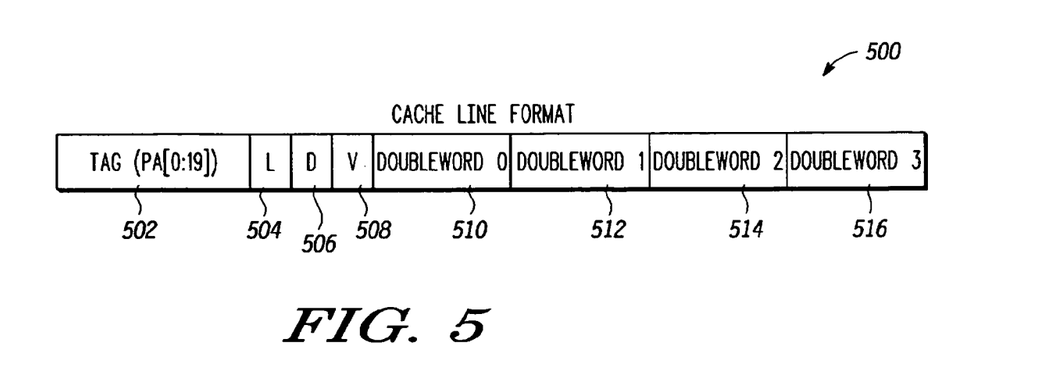
FIG. 5 is a block diagram illustrating an exemplary cache line format in accordance with at least one embodiment of the present disclosure.

Referring to FIG. 2, a more detailed exemplary implementation of the unified cache 104 is illustrated in accordance with at least one embodiment of the present disclosure. In the depicted example, the data array 114 of the unified cache 104 has eight ways (way 0-way 7), each way having cache lines for a plurality of sets and a corresponding set of tags in the cache tag array 112. FIG. 5 illustrates an exemplary format for the cache lines of the tag array 112 and the data array 114. As shown, the cache line 500 can include a tag address field 502 having twenty bits of the corresponding physical address (PA[0:19]) associated with the data stored by the cache line 500, a line lock bit field 504 to indicate whether the cache line 500 is locked, a line dirty bit field 506 to indicate whether the cache line 500 has been modified, a valid bit field 508 to indicate whether the cache line 500 is valid, and a plurality of data fields to store data for use by the processor core 102 (FIG. 1), such as data fields 510-516 (storing doublewords 0-3 or DW0-DW3). The cache line 500 further can include, for example, one or more parity fields (not shown).

Referring back to FIG. 2, the cache controller 116 (FIG. 1) of the cache 104 includes a plurality of comparators 202 (e.g., comparator 0-comparator 7 corresponding to way 0-way 7, respectively), each having an input to receive the data from the selected cache tag of the cache tag array 112, a hit control component 204 comprising a plurality of OR gates to perform a logical OR operation on the output of the comparators 202 to determine a cache hit, and circuitry to provide the proper select value to a multiplexer 206 having an input to receive the data from a cache line of one or more of the ways 0-7 of the data array 114.

During typical operation, the processor core 102 (FIG. 1) provides a virtual address 212 associated with an instruction to be executed to the cache controller 116 and the MMU 106. The MMU 106 uses the virtual address 212 to obtain the corresponding physical address 214. The cache controller 116 uses an index portion 216 (e.g., A[20:26]) of the virtual address 212 as a set select input to index the corresponding set of the plurality of sets of the data array 114 and cache tag array 112. The cache tag data (e.g., tag address 502 and status fields 504-510, FIG. 5) associated with each way of the indexed set is input to its corresponding comparator 202, as is the physical address 212 as a tag reference (A[0:19]). Each comparator 202 compares the tag reference (physical address 212) with the tag address field of the corresponding cache tag to identify a match. The comparator 202 further may consider the status fields to determine whether the cache tag is valid, dirty, etc. If the tag reference and the tag address field match and the cache tag is valid (i.e., the corresponding cache line contains the requested data), the comparator 202 asserts its output (illustrated as HIT 0-7), which is supplied to the hit control component 204. If one of the outputs of the comparators 202 is asserted, the hit control component 204 asserts its HIT output to indicate that a cache hit has occurred. Otherwise, the HIT output is deasserted to indicate that a cache miss has occurred. If there is a cache hit, the hit control component 204 further identifies the hit way and provides a select signal to the MUX 206 indicating the identified way. The MUX 206 has a plurality of inputs to receive the data [e.g., datawords DW0-DW3) stored in the cache lines of the plurality of ways associated with the indexed set. Using the select input from the hit control component 204, the MUX 206 selects the data field of the identified way for output. It will be appreciated that, in some embodiments, this output data contains more data units than requested by the processor core 102. For example, the data fields of the cache lines may be implemented as thirty-two byte fields (e.g., four doubleword units), whereas the data path 132 (FIG. 1) may be set up for a four byte-wide data unit or an eight-byte data unit. Accordingly, a data select portion 218 of the virtual address 212 may be used to select between the plurality of data units of the output data from the MUX 206. To illustrate, if the data unit requested by the processor core 102 is four bytes and the data output is thirty-two bytes, bits [27:29] of the virtual address 212 may be used as the data selection portion 218 to select between the eight words of the thirty-two byte output. The selected data unit then is provided to the processor core 102. Writes to the cache 104 are performed in a similar manner. In other embodiments, the data array 114 may be partitioned such that only the requested information size (e.g. a single doubleword of DW0-DW3) from each way is accessed and provided to MUX 206

In certain instances, a sequence of instructions to be executed by the processor core 102 may result in the same cache line being accessed to obtain instruction information for each instruction of the sequence. To illustrate, assuming a cache line of thirty-two bytes and a fixed instruction length of four bytes, a cache line accessed to obtain instruction information for a first instruction may also contain instruction information for up to three subsequent instructions, depending on the position of the instruction information within the thirty-two byte cache line and the distribution of instruction information within the cache and the memory that it represents. In such instances, it typically is unnecessary to access the cache tag array because it was already accessed for the first instruction in the sequence and the way of the accessed cache line is already known. Accordingly, in at least one embodiment, for certain instruction accesses, the controller 116 enables the identified way, disables the remaining ways and disables the cache tag array 112. The cache line of the enabled way is accessed to obtain the data in the cache line. The requested instruction information then may be provided to the processor core 102. By identifying an instruction as resulting in an access to a cache line accessed by a previous instruction, the unnecessary components of the cache 104 may be disabled during the cache access for the subsequent instruction, thereby reducing the power consumption of the cache 104. Moreover, by maintaining state information for instruction accesses, data accesses may intervene between instruction accesses to the unified cache without affecting the ability to disable cache components for subsequent sequential instruction accesses.

To initiate a power conservation mode, the controller 116 determines whether an instruction access for an instruction to be executed will access the same cache line of the same way as the instruction access for the previous instruction. To identify an instruction access as sequential, the controller 116 typically determines that a current instruction access is sequential to an immediately preceding instruction access, and that the current instruction access will access the same cache line as the previous instruction access, even with intervening data accesses to the unified cache which are non-sequential to either instruction access.

In the illustrated embodiment, the processor core 102 provides an instruction sequential (active low) (ISEQ*) signal 226 as part of control 118 (FIG. 1). The ISEQ* signal 226 indicates whether the instruction access is sequential to the previous sequential access. In the illustrated example, the ISEQ* signal 226 is active low and therefore indicates a sequential instruction access when asserted low and a non-sequential instruction access when deasserted high. However, if sequential instruction fetches are interrupted by intervening data accesses to the cache 104, the ISEQ* signal 226 may continue to be provided so that once the data fetches are complete, cache controller 116 may continue to enable or disable components of the cache 104 depending on whether the next instruction access is sequential and/or the status of the hit information 122. Therefore, the ISEQ* signal 226 typically is dependent upon such events as changes of flow (i.e. branches that cause sequential instruction fetching to be interrupted), data fetches, and instruction fetches.

In the event that the ISEQ* signal 226 is asserted, the enable control module 120 accesses the hit information register array 122 and the state flag 124 to determine whether one or more ways of the data array 114 and/or the cache tag array 112 are to be disabled. In one embodiment, the hit information register array 122 includes one or more registers to store access information associated with the previous instruction access, such as, for example, the accessed way for the previous instruction access. The state flag 124 provides an indication of whether any events have occurred such as, for example, a cache miss operation which could potentially replace the cache line, cache maintenance operations such as invalidating the cache line, or other write operations to the cache line tag information that may cause the data of the cache line of the identified way to be potentially invalid for satisfying the instruction access. Also, in at least one embodiment, the state flag may be cleared when the previous instruction access is to the end of the cache line, since a subsequent sequential access will not be to the same cache line, and may need access to a different way to be properly completed. If the state flag 124 indicates that the cache line of the identified way is valid for instruction access, the enable control module 120 enables the identified way and disables some or all of the remaining ways by, for example, asserting or deasserting way enable signals way_en 0-way_en 7 as appropriate. Further, the enable control module 120 may assert or deassert a tag_en signal 228 to enable or disable the cache tag array 112 as appropriate. In response to the deassertion of one or more of the way enable signals way_en 0-way_en 7, the power supplied to the corresponding ways may be reduced or shutoff, a clock signal may be clock-gated, and the like. In response to the assertion of a way enable signal, the power supplied to the corresponding way may be increased or turned on, a clock signal may no longer be clock gated, and the like. The tag_en signal 228 may enable or disable the cache tag array 112 in a similar manner.

Figure 3:
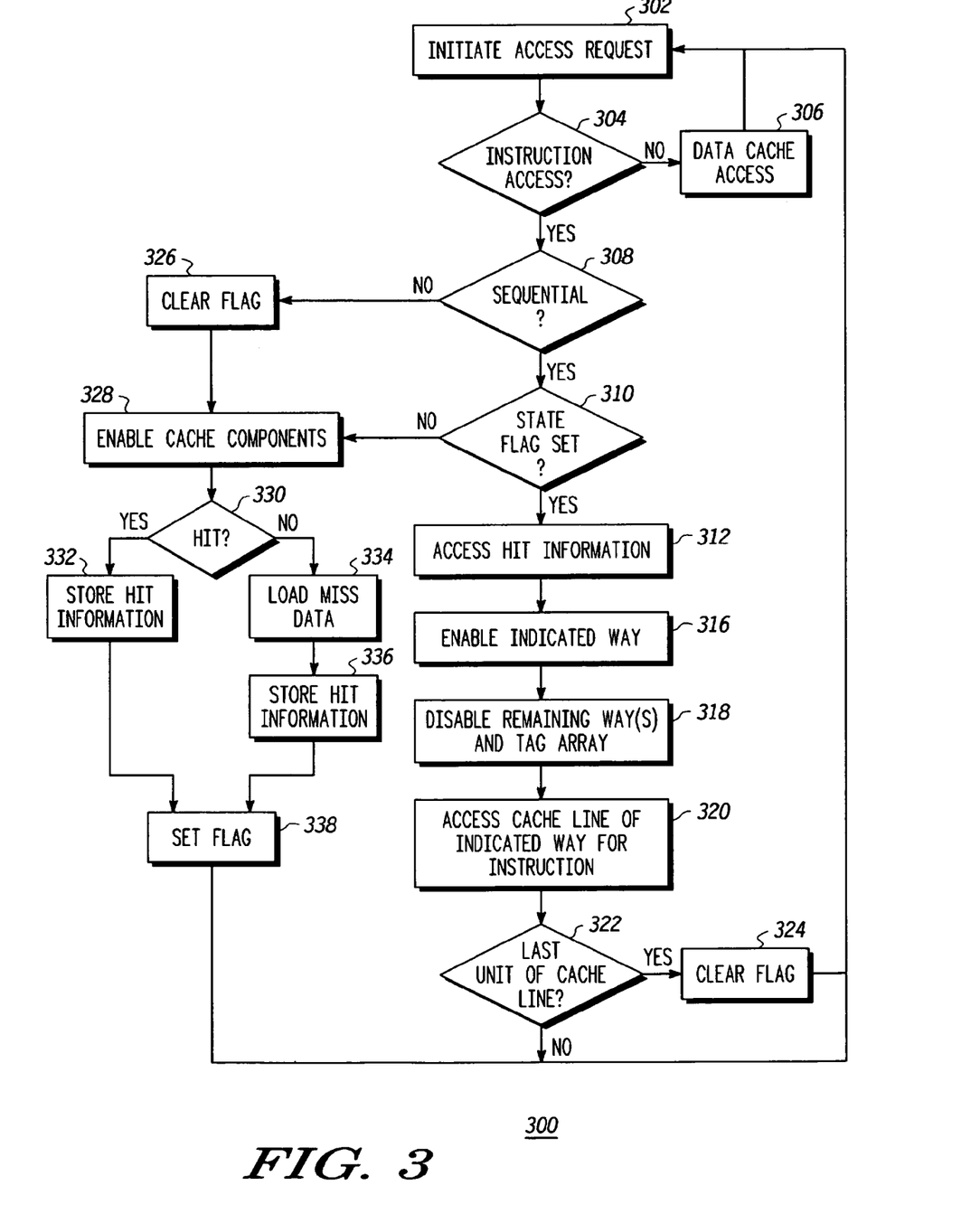
FIG. 3 is a flow diagram illustrating an exemplary method for reduced unified cache power consumption in accordance with at least one embodiment of the present disclosure.

Referring to FIG. 3, an exemplary method 300 for cache power conservation during sequential instruction access is illustrated in accordance with at least one embodiment of the present disclosure. The method 300 initiates at step 302 wherein the processor core 102 initiates a cache access request. At step 304 the cache controller 116 determines whether the cache access request is an instruction access request or a data access request. If a data access request, the unified cache components are enabled (if not already enabled) and a cache lookup is performed to obtain the requested data from the unified cache in step 306. At noted above, in at least one embodiment, data accesses to the unified cache do not affect the state flag 124 or the hit information 122 even when they intervene between instruction accesses.

If the access request is an instruction access request, it is determined whether the instruction cache access is sequential to the last instruction cache access at step 308. If the next instruction access is identified as sequential to the previous instruction access, the processor core 102 asserts the ISEQ* signal 226 (thereby indicating that the next instruction access is sequential). In response, the enable control module 120 determines whether the state flag 124 is set at step 310. If the state flag 124 is asserted, the enable control module 120 accesses the hit information register array 122 at step 312 to identify the way accessed during the previous instruction access. The enable control module 120 enables the identified way at step 316 and disables some or all of the remaining ways and the cache tag array 112 at step 318. At step 320 the cache line of the enabled way is accessed to obtain the data of the cache line. The data unit(s) of the data of the cache line representing the instruction information are identified and the instruction information is provided to the processor core 102.

At step 320, the enable control module 120 determines whether the requested instruction information includes the last data unit of the accessed cache line. For example, assuming DW0 represents the first doubleword and DW3 represents the last doubleword, if the requested instruction information is stored at DW3, the requested instruction information is at the last data unit of the cache line. It will be appreciated that when the instruction information for an instruction access is at the last data unit of the cache line, the next sequential instruction access will not be located in the same cache line. Accordingly, at step 324 the state flag 124 is cleared if the instruction information includes the last data unit. The method 300 returns to step 302 for the next cache access request.

If the instruction access request is determined to be non-sequential at step 308, the processor core 102 deasserts the ISEQ* signal 226 (thereby indicating that the next instruction access is not sequential). In response, the enable control module 120 clears the state flag 126 at step 326 and enables any disabled cache components at step 328. Similarly, if the enable control module 120 determines that the state flag was not set at step 310, the method 300 continues to step 328 wherein any disabled cache components are enabled.

Using the virtual address provided by the processor core 102, the cache tag array 112 is indexed and the physical address portion of the indexed cache tag is compared to the physical address from the MMU 106 and the valid bit field 508 (FIG. 5) is analyzed to determine if there is a cache hit or a cache miss at step 330. If a cache hit occurs, an indicator of the way identified as having the cache line with the requested instruction information is stored as hit information in the hit information register array 122 at step 332 and the state flag 124 is set at step 338. The data unit(s) of the data of the cache line representing the instruction information are identified and the instruction information is provided to the processor core 102. If a cache miss occurs at step 330, the requested data is loaded into the cache 104 from memory at step 334, the way into which the instruction information is loaded is stored as hit information in the hit information register array 122 at step 336, and the state flag 308 is set at step 338. The data unit(s) of the data of the cache line loaded from memory representing the instruction information are identified and the instruction information is provided to the processor core 102. The method 300 then may return to step 302 for the next cache access request.

As noted above, cache maintenance operations may affect the status of a cache line between cache accesses. Accordingly, if the cache controller 116 detects a cache maintenance operation has occurred at any time during method 300, the state flag 124 is cleared to indicate the uncertain state of the identified cache line and the method returns to step 302.

Figure 4:
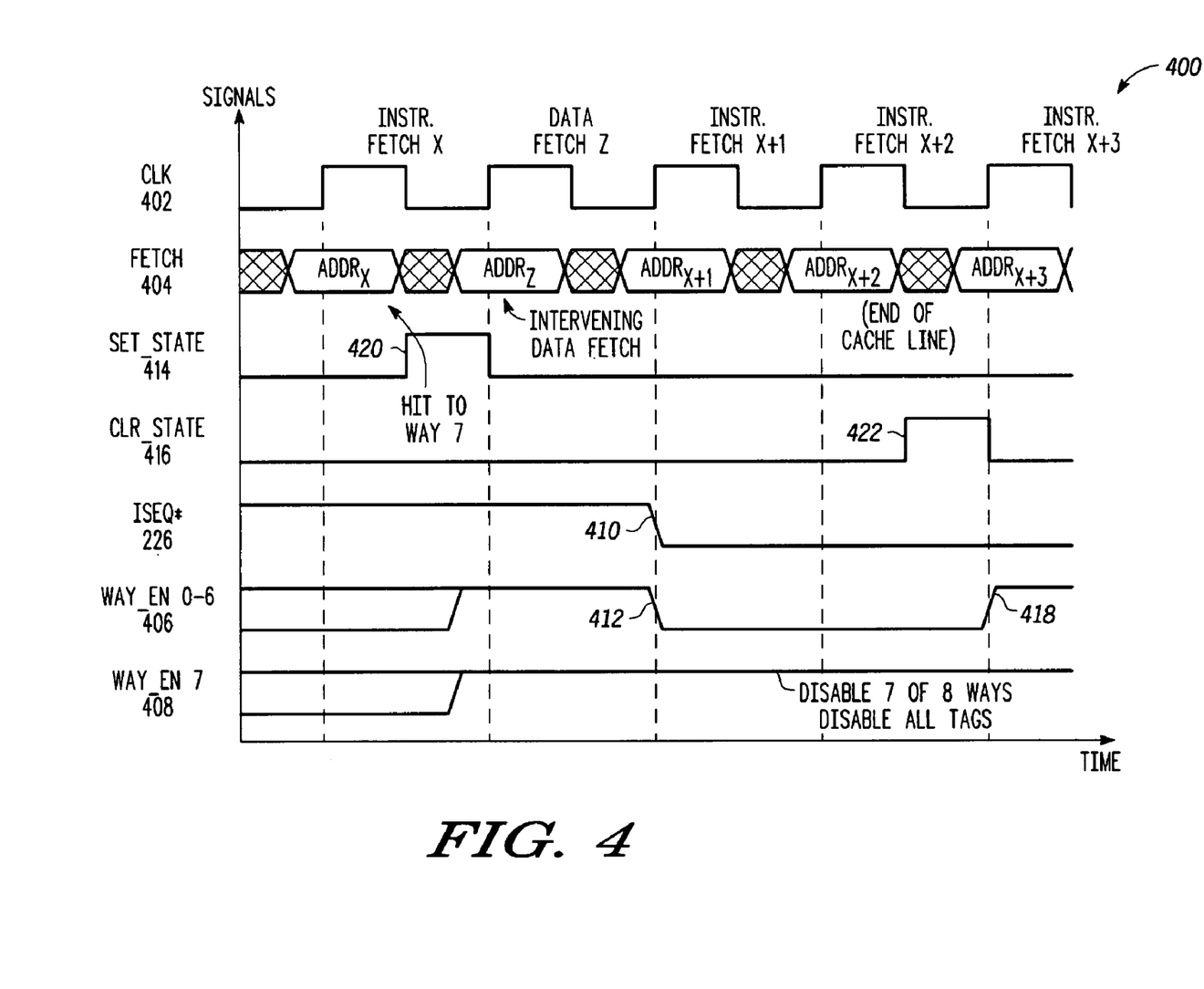
FIG. 4 is a timing diagram illustrating an exemplary operation of the unified cache of FIG. 2 in accordance with at least one embodiment of the present disclosure.

Referring now to FIG. 4, an exemplary timing diagram 400 depicting an operation of the cache 104 while fetching sequential code interspersed with a data access is illustrated in accordance with at least one embodiment of the present disclosure. FIG. 4 illustrates a clock signal 402, the fetch address stage 404 of the processor core 102 (FIG. 1), the SET_STATE signal 414, the CLR_STATE signal 416, the ISEQ* signal 226, way enable signals for ways 0-6 of the data array 114 (FIG. 1), represented as way enable signals 406, and the way enable signal 408 for way 7 of the data array 114.

During a first clock cycle illustrated in FIG. 4 (labeled with "Instruction Fetch X") the instruction information stored at address X is fetched, resulting in a hit from a cache line of way 7 of the cache 104. An identifier associated with way 7 is stored as hit information in the hit information register array 122 (FIG. 2) and the state flag 124 (FIG. 2) is set via the assertion of SET_STATE signal 414 at time 420 as described above. In the depicted example, it is assumed that this instruction access is the first instruction access and the ISEQ* signal 226 therefore is illustrated as negated.

During the following clock cycle an intervening data fetch from address location Z occurs. As noted above, in one embodiment, intervening data accesses to the unified cache 104 do not cause any changes to be made to the ISEQ* signal 226, the hit information or the state flag 124 so that cache components may be enabled or disabled as appropriate if the next instruction address is sequential to the previous instruction access regardless of any intervening data accesses to the unified cache 104. For the intervening data access, all ways of data array 114 and tag array 112 of unified cache 104 typically are enabled to perform the data lookup. Cache enable control module 120 (FIG. 2) of the cache controller 116 is responsive to the type of access (instruction vs. data, provided via control 118 (FIG. 1) to determine whether to utilize the stored hit information 122 and state flag 124 to control disabling of one or more ways of data array 114 and tag array 112.

During the next cycle, labeled "Inst. Fetch X+1", the processor core 102 initiates the fetching of instruction information located at address X+1 (which is sequential to the previous instruction fetch from address X) from the unified cache 104. Accordingly, the processor core 102 asserts the ISEQ* signal 226 at time 410 to indicate that the instruction access is sequential to the previous instruction access. In response, the enable control module 120 (FIG. 2) of the cache controller 116 accesses the hit information from the hit information register array 122 to determine the way accessed during the previous instruction access and further accesses the state flag 124 to determine the status of this information. Assuming the state flag 124 is set, the enable control module 120 deasserts the way enable signals 406 to disable ways 0-6 of the data array 114 of the unified cache 112 and asserts (if not already asserted) the way enable signal 408 to enable way 7 of the data array 114 at time 412. The enable control module 120 further may deassert the enable signals provided to the cache tag array 112 and/or other cache components. As way 7 of the cache 104 is enabled, the instruction stored in the corresponding cache line of way 7 may be accessed during the instruction fetch, while the remaining ways are disabled, thereby conserving power.

In the illustrated example, it is assumed that the instruction accesses occurring for addresses X+2 and X+3 (labeled "Inst. Fetch X+2" and "Inst. Fetch X+3", respectively) are sequential to the instruction access for addresses X and X+1. Accordingly, the ISEQ* signal 226 remains asserted and the enable control module 120 continues to deassert way enable signals 406 and assert way enable signal 408 for the access labeled "Inst. Fetch X+2" so that the cache line of way 7 of the data array 114 may be accessed for this instruction access while ways 0-6 remain disabled. Thus, way 7, which is accessed during the instruction access to address X+2, remains enabled while the remaining ways, and the tag array 112, which are not needed to access the instruction information, are disabled so as to conserve power. During the instruction access occurring for address X+2, cache control 116 determines that this access is occurring to an address at the end of the cache line containing addresses X, X+1, and X+2, thus the next access, even though it may be sequential to address X+2, does not fall in the same cache line. Accordingly, CLR_STATE signal 416 is asserted at time 422 to clear the state flag 124 in preparation for the next instruction access.

During the next cycle, labeled "Inst. Fetch X+3", the processor core 102 initiates the fetching of instruction information located at address X+3 (which is sequential to the previous instruction fetch from address X+2) from the unified cache 104. Accordingly, the ISEQ* signal 226 remains asserted to indicate that the instruction access is sequential to the previous instruction access. In response, the enable control module 120 (FIG. 2) of the cache controller 116 accesses the hit information from the hit information register array 122 to determine the way accessed during the previous instruction access and further accesses the state flag 124 to determine the status of this information. In this case, the state flag 124 is cleared, so the enable control module 120 asserts the way enable signals 406 at time 418 to enable ways 0-6 of the data array 114 of the unified cache 112 and asserts (if not already asserted) the way enable signal 408 to enable way 7 of the data array 114 at time 412. The enable control module 120 further asserts the enable signals provided to the cache tag array 112 and/or other cache components. Even though the instruction access to address X+3 is sequential to the previous instruction access to address X+2, state flag 124 indicates that the instruction information associated with address X+2 may not be available from the stored hit information indicative of way 7.

By maintaining state information related to instruction accesses and appropriately signaling that a current instruction access to a unified cache is sequential to a previous instruction access to the unified cache even though the current cache access is not sequential to the immediately preceding cache access, the exemplary techniques for enabling or disabling components of a unified cache during instruction accesses disclosed herein typically reduce the power consumption of a unified cache and therefore lower the power in system 100.

Other embodiments, uses, and advantages of the disclosure will be apparent to those skilled in the art from consideration of the specification and practice of the techniques disclosed herein. The specification and drawings should be considered exemplary only, and the scope of the disclosure is accordingly intended to be limited only by the following claims and equivalents thereof.

What is claimed is:

1. A method comprising:
accessing, during a first instruction access, a first cache line of a first way of a unified cache having a plurality of ways to obtain instruction information associated with a first instruction;
in response to the first cache line comprising instruction information associated with a second instruction:
enabling the first way for a second instruction access; and
disable one or more of the remaining ways of the unified cache for the second instruction access by at least one of clock gating the one or more of the remaining ways or reducing power supplied to the one or more of the remaining ways; and
accessing, during the second instruction access, the first cache line of the first way to obtain instruction information associated with the second instruction.

2. The method of claim 1, further comprising:
disabling a cache tag array of the unified cache in response to the first cache line comprising instruction information associated with the second instruction.

3. The method of claim 1, further comprising:
accessing the unified cache for one or more data accesses between the first instruction access and the second instruction access, wherein the plurality of ways of the cache are enabled during the one or more data accesses.

4. The method of claim 1, wherein enabling the first way and disabling one or more of the remaining ways is further in response to a determination that a state flag is asserted.

5. The method of claim 4, wherein the state flag is maintained during one or more data accesses.

6. The method of claim 4, further comprising:
clearing the state flag in response to a cache maintenance operation.

7. The method of claim 4, further comprising:
clearing the state flag when the instruction information associated with the second instruction comprises the last data of the first cache line.

8. A system comprising:
a unified cache comprising a tag array and a data array, the data array comprising a plurality of ways, each way comprising a plurality of cache lines;
a cache controller coupled to the tag array and data array, wherein the cache controller is operable to:
access, during a first instruction access, a first cache line of a first way of the unified cache to obtain instruction information associated with a first instruction;
in response to the first cache line comprising instruction information associated with a second instruction:
enable the first way for a second instruction access; and
disable one or more of the remaining ways of the unified cache for the second instruction access by reducing power supplied to the one or more of the remaining ways; and
access, during the second instruction access, the first cache line of the first way to obtain instruction information associated with the second instruction.

9. The system of claim 8, wherein the cache controller further is operable to:
disable a cache tag array of the unified cache in response to the first cache line comprising instruction information associated with the second instruction.

10. The system of claim 8, wherein the cache controller is operable to enable the first way and disable one or more of the remaining ways further in response to a determination that a state flag is asserted.

11. The system of claim 10, wherein the state flag is maintained during one or more data accesses.

12. The system of claim 10, wherein the cache controller further is operable to:
clear the state flag in response to a cache maintenance operation.

13. The system of claim 10, wherein the cache controller further is operable to:
clear the state flag when the instruction information associated with the second instruction comprises the last data of the first cache line.

14. A system comprising:
a unified cache comprising a tag array and a data array, the data array comprising a plurality of ways, each way comprising a plurality of cache lines;
a cache controller coupled to the tag array and data array, wherein the cache controller is operable to:
access, during a first instruction access, a first cache line of a first way of the unified cache to obtain instruction information associated with a first instruction;
in response to the first cache line comprising instruction information associated with a second instruction:
enable the first way for a second instruction access; and
disable one or more of the remaining ways of the unified cache for the second instruction access by clock gating the one or more of the remaining ways; and
access, during the second instruction access, the first cache line of the first way to obtain instruction information associated with the second instruction.

15. The system of claim 14, wherein the cache controller further is operable to:
disable a cache tag array of the unified cache in response to the first cache line comprising instruction information associated with the second instruction.

16. The system of claim 14, wherein the cache controller is operable to enable the first way and disable one or more of the remaining ways further in response to a determination that a state flag is asserted.

17. The system of claim 16, wherein the state flag is maintained during one or more data accesses.

18. The system of claim 16, wherein the cache controller further is operable to:
clear the state flag in response to a cache maintenance operation.

19. The system of claim 16, wherein the cache controller further is operable to:
clear the state flag when the instruction information associated with the second instruction comprises the last data of the first cache line.

* * * * *